United States Patent
Jokanovic et al.

(10) Patent No.: US 12,422,545 B2
(45) Date of Patent: Sep. 23, 2025

(54) DETECTION AND LOCALIZATION OF NON-LINE-OF-SIGHT OBJECTS USING MULTIPATH RADAR REFLECTIONS AND MAP DATA

(71) Applicant: Aptiv Technologies AG, Schaffhausen (CH)

(72) Inventors: Branka Jokanovic, Agoura HIlls, CA (US); William Snyder, Westlake Village, CA (US); Mohamed A. Moawad, Westfield, IN (US); Michael H. Laur, Mission Viejo, CA (US)

(73) Assignee: Aptiv Technologies AG, Schaffhausen (CH)

( * ) Notice: Subject to any disclaimer, the term of this patent is extended or adjusted under 35 U.S.C. 154(b) by 334 days.

(21) Appl. No.: 17/663,710

(22) Filed: May 17, 2022

(65) Prior Publication Data
US 2023/0144600 A1    May 11, 2023

Related U.S. Application Data

(60) Provisional application No. 63/276,180, filed on Nov. 5, 2021.

(51) Int. Cl.
*G01S 13/931*    (2020.01)

(52) U.S. Cl.
CPC ................... *G01S 13/931* (2013.01)

(58) Field of Classification Search
CPC ........ G01S 13/931; G01S 13/91; G01S 13/46; G01S 13/42; G01S 7/2923; G01S 7/41;
(Continued)

(56) References Cited

U.S. PATENT DOCUMENTS 9,229,098 B2 *   1/2016  Gross ..................... G01S 13/06
9,983,305 B2 *   5/2018  Pavek ................... G01S 13/931
(Continued)

FOREIGN PATENT DOCUMENTS

DE    102018000600 A1    8/2018
DE    102018213015 A1    2/2020
(Continued)

OTHER PUBLICATIONS

JP2020197506A_Description_20240613_1403.pdf—translation of JP2020197506A (Year: 2020).*
(Continued)

*Primary Examiner* — Vladimir Magloire
*Assistant Examiner* — Yonghong Li
(74) *Attorney, Agent, or Firm* — Harness, Dickey & Pierce, P.L.C.

(57) ABSTRACT

This document describes techniques and systems to detect and localize NLOS objects using multipath radar reflections and map data. In some examples, a processor of radar system can identify a detection of an object using reflected EM energy and determine, using map data, whether a direct-path reflection associated with the detection is within a roadway. In response to determining that the direct-path reflection is not located within the roadway, the processor can determine whether a multipath reflection (e.g., a multipath range and multipath angle) associated with the detection is viable. In response to determining that the multipath reflection is viable, the processor can determine that the detection corresponds to an NLOS object. The processor can also provide the NLOS object as an input to an autonomous or semi-autonomous driving system of the vehicle, thereby improving the safety of such systems.

13 Claims, 9 Drawing Sheets

(58) Field of Classification Search
CPC ........ G01S 7/411; G01S 7/414; G01S 13/865; G01S 13/867; G01S 2013/462; G01S 2013/464; G01S 2013/9316; G01S 2013/9322; G01S 2013/93271; G01S 7/415; G01C 21/3415

See application file for complete search history.

(56) References Cited

U.S. PATENT DOCUMENTS

| | | | |
|---|---|---|---|
| 2017/0285164 A1 | 10/2017 | Kato | |
| 2018/0120842 A1* | 5/2018 | Smith | G01S 7/412 |
| 2019/0033439 A1 | 1/2019 | Gu et al. | |
| 2020/0278435 A1* | 9/2020 | Wang | G01S 13/931 |
| 2021/0104027 A1* | 4/2021 | Longman | G01S 13/726 |

FOREIGN PATENT DOCUMENTS

| | | | |
|---|---|---|---|
| EP | 2784538 A2 | | 10/2014 |
| JP | 2020197506 A | * | 12/2020 |

OTHER PUBLICATIONS

"Extended European Search Report", EP Application No. 22196427.3, Mar. 13, 2023, 14 pages.

Scheiner, et al., "Seeing Around Street Corners: Non-Line-of-Sight Detection and Tracking In-the-Wild Using Doppler Radar", Mar. 31, 2020, pp. 2068-2077.

Visentin, et al., "Analysis of Multipath and DOA Detection Using a Fully Polarimetric Automotive Radar", Apr. 3, 2018, pp. 570-577.

Office Action regarding European Patent Application No. 22196427.3, dated Jan. 20, 2025.

\* cited by examiner

DETECTION AND LOCALIZATION OF NON-LINE-OF-SIGHT OBJECTS USING MULTIPATH RADAR REFLECTIONS AND MAP DATA

CROSS-REFERENCE TO RELATED APPLICATION

This application claims the benefit of U.S. Provisional Patent Application No. 63/276,180, filed Nov. 5, 2021, which is incorporated by reference herein in its entirety.

BACKGROUND

Many vehicles use vision-based systems or radar systems to detect and track objects (e.g., other vehicles) for assisted-driving systems and autonomous-driving systems. Vision-based systems, however, generally cannot detect objects located outside their direct line of sight. Radar systems generally only track line-of-sight objects. In many automotive environments (e.g., windy roads, blind curves, blind crests, urban intersections), detection of moving non-line-of-sight (NLOS) objects would improve object tracking and allow for early detection to improve safety.

SUMMARY

This document describes techniques and systems to detect and localize and NLOS objects using multipath radar reflections and map data. In some examples, a radar system for installation on a vehicle includes a transmitter, a receiver, and a processor. The processor can identify a detection of an object using reflected EM energy and determine, using map data, whether a direct-path reflection associated with the detection is within a roadway corresponding to the vehicle's travel path. In response to determining that the direct-path reflection is not located within the roadway, the processor can determine whether a multipath reflection (e.g., a multipath range and multipath angle) associated with the detection is viable. The viability of the multipath reflection can be based on the presence of reflective surfaces in the vicinity of the vehicle. In response to determining that the multipath reflection is viable, the processor can determine that the detection corresponds to an NLOS object and, in some implementations, start a track for the NLOS object. The processor can also indicate the NLOS object as an input to an autonomous or semi-autonomous driving system of the vehicle. In this way, the described techniques and systems can enable a radar system to detect and localize NLOS objects, thereby improving the safety of autonomous and semi-autonomous driving systems.

This document also describes methods performed by the above-summarized system and other configurations of the radar system set forth herein and means for performing these methods.

This Summary introduces simplified concepts related to detecting and localizing NLOS objects using multipath radar reflections and map data that are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of techniques and systems to detect and localize NLOS objects using multipath radar reflections and map data are described in this document with reference to the following figures. The same numbers are often used throughout the drawings to reference like features and components:

FIG. 6-1 through 6-4 illustrate example detections and localizations of an NLOS object using multipath radar reflections and map data in accordance with techniques of this disclosure.

DETAILED DESCRIPTION

Overview

Figure 1:
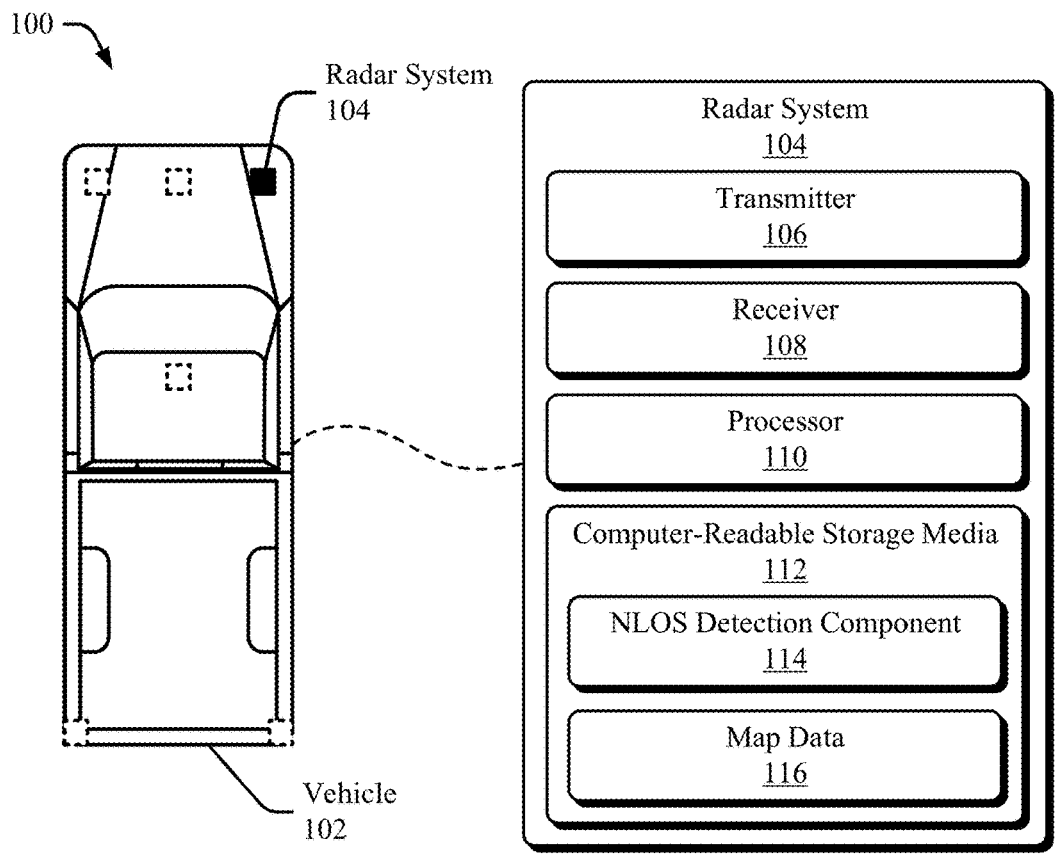
FIG. 1 illustrates an example environment in which a radar system can detect and localize NLOS objects using multipath radar reflections and map data in accordance with techniques of this disclosure.
Figure 1:
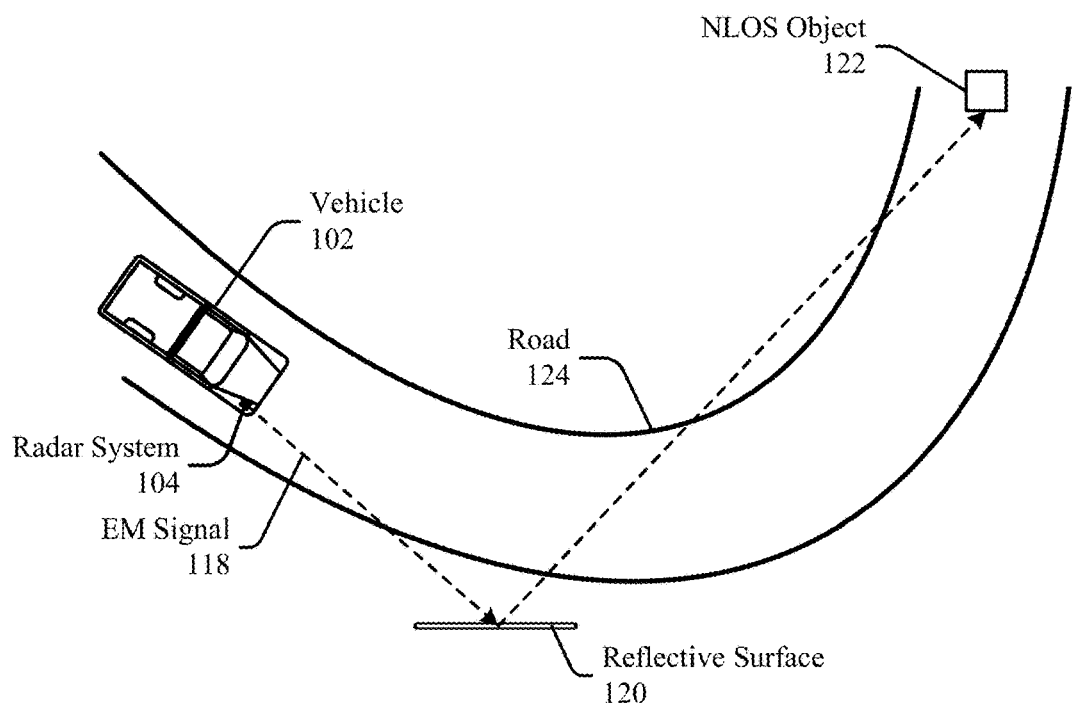

Many vehicles use vision-based systems and/or radar systems to detect and track objects (e.g., other vehicles). For example, a camera can capture images of a vehicle's environment and process the image data to identify objects. Vision-based systems, however, generally cannot detect objects located outside their direct line of sight. As a result, these vision-based systems are unable to detect NLOS objects in many automotive environments, including windy roads, blind curves, blind crests, and urban intersections.

Radar systems use antennas to transmit and receive electromagnetic (EM) signals for detecting and tracking objects. In automotive applications, radar systems operate in dynamic environments that can cause EM signals to have multipath reflections. Multipath reflections occur when a reflective surfaces (e.g., a wall, fence, barrier, guardrail, sign, or another vehicle) creates one or more additional reflections to an EM signal. The multipath environment can result in both direct-path reflections and multipath reflections. A direct-path reflection occurs when a reflected EM signal travels directly between the radar system and the object. Typically, multipath reflections occur when the received EM signals reflect off one or more objects and take multiple paths to travel between the object and the radar system. In this document, it is understood that multipath reflections can also describe a single, indirect path from an object. Multipath reflections, however, create mirror images (e.g., echoes) of the detected object. Radar systems generally do not have a simple way to differentiate between an object's direct return and its multipath echo. As a result, due to their outlier appearance, NLOS objects are typically perceived as noise and negatively impact tracking systems. As a result, radar systems generally filter out multipath reflections and, thus, are unable to detect NLOS objects.

In contrast, this document describes techniques and systems to detect and localize NLOS objects using multipath radar reflections and map data. Taking advantage of multipath reflections, radar systems can be configured as an important sensing technology that vehicle-based systems use to acquire information about the surrounding environment, including NLOS objects. Vehicle-based systems can use radar systems to detect objects around a blind corner, vehicles on the opposite side of a crest and, if necessary, take necessary actions (e.g., stop, reduce speed, change lanes) to avoid a collision.

For example, a radar system can include a transmitter to transmit EM energy and a receiver to receive EM energy reflected by objects in a vicinity of a vehicle. The radar system also includes one or more processors to perform the NLOS-object detection and localization. Using the received EM energy, the processor can identify a detection of an object in the vehicle's vicinity. The processor can determine, using map data, whether a direct-path reflection (e.g., a direct-path angle and direct-path range) associated with the detection is located within the roadway. Responsive to determining that the direct-path reflection associated with the detection is not located within the roadway, the processor can determine whether a multipath reflection (e.g., a multipath range and multipath angle) associated with the detection is viable. Viability can include, but not be limited to, a reflective surface identified in the environment by sensors or in map data as well as registering the multipath reflection and multipath-tracked NLOS object on a map to determine if it is located in a lane beyond sensor range. Responsive to determining that the multipath reflection is viable, the processor can determine that the detection corresponds to an NLOS object and indicate the NLOS object as an input to an autonomous or semi-autonomous driving system. In this way, the described systems and techniques can provide NLOS detection and localization without the added cost of high-precision lidar systems. The NLOS detection and localization can also be used to improve the safety of assisted-driving or autonomous-driving systems.

This example is just one example of the described techniques and systems to detect and localize NLOS objects using multipath radar reflections and map data. This document describes other examples and implementations.

Operating Environment

FIG. 1 illustrates an example environment 100 in which a radar system 104 can detect and localize NLOS objects using multipath radar reflections and map data in accordance with the techniques of this disclosure. In the depicted environment 100, the radar system 104 is mounted to, or integrated within, a vehicle 102 traveling on a road 124. The radar system 104 can detect one or more objects in the vicinity of the vehicle 102, including an NLOS object 122 which is not within the line-of-sight of the radar system 104. In the depicted environment, the road 124 includes a blind corner obstructing the view of the radar system 104.

Although illustrated as a passenger truck, the vehicle 102 can represent other types of motorized vehicles (e.g., a car, an automobile, a motorcycle, a bus, a tractor, a semi-trailer truck), non-motorized vehicles (e.g., a bicycle), railed vehicles (e.g., a train), watercraft (e.g., a boat), or aircraft (e.g., an airplane). In general, manufacturers can mount the radar system 104 to any moving platform, including moving machinery or robotic equipment.

In the depicted implementation, the radar system 104 is mounted on the front of the vehicle 102 and illuminates the object 122 via a reflection off of a reflective surface 120 (e.g., a guardrail). The radar system 104 can detect the NLOS object 122 from any exterior surface of the vehicle 102. For example, vehicle manufacturers can integrate the radar system 104 into a bumper, side mirror, headlights, rear lights, or any other interior or exterior location where objects require detection. In some cases, the vehicle 102 includes multiple radar systems 104, such as a first radar system 104 and a second radar system 104, that provide a larger instrument field-of-view. In general, vehicle manufacturers can design the locations of the radar systems 104 to provide a particular field-of-view that encompasses a region of interest. Example fields-of-view include a 360-degree field-of-view, one or more 180-degree fields-of-view, one or more 90-degree fields-of-view, and so forth, which can overlap or be combined into a field-of-view of a particular size.

The NLOS object 122 and the reflective surface 120 are composed of one or more materials that reflect radar signals. Depending on the application, the NLOS object 122 can represent a target of interest. In some cases, the NLOS object 122 and the reflective surface 120 can be moving objects (e.g., other vehicles) or stationary objects (e.g., roadside signs, road barriers, debris). Depending on the application, the NLOS object 122 can represent a target of interest from which the vehicle 102 can safely navigate the road 124.

The radar system 104 emits EM radiation by transmitting EM signals 118 or waveforms via antenna elements. In the environment 100, the radar system 104 can detect and track the NLOS object 122 by transmitting and receiving one or more radar signals. For example, the radar system 104 can transmit EM signals between one hundred and four hundred gigahertz (GHz), between four and one hundred GHz, or between approximately seventy and eighty GHz.

The radar system 104 can be a MIMO radar system that relies on uniform linear arrays (ULAs) to match the reflected EM signals to corresponding objects. The radar system 104 can also operate as a traditional radar system that does not rely on MIMO techniques. The radar system 104 can include a transmitter 106 to transmit the EM signals 118. The radar system 104 can also include a receiver 108 to receive reflected versions of the EM signals 118. The transmitter 106 includes one or more components, including an antenna or antenna elements, for emitting the EM signals 118. The receiver 108 includes one or more components, including an antenna or antenna elements, for detecting the reflected EM signals. The transmitter 106 and the receiver 108 can be incorporated together on the same integrated circuit (e.g., a transceiver integrated circuit) or separately on different integrated circuits. In other implementations, the radar system 104 does not include a separate antenna, but the transmitter 106 and the receiver 108 each include one or more antenna elements.

The radar system 104 also includes one or more processors 110 (e.g., an energy processing unit or electronic control unit) and computer-readable storage media (CRM) 112. The processor 110 can be a microprocessor or a system-on-chip. The processor 110 can execute instructions stored in the CRM 112. For example, the processor 110 can process EM energy received by the receiver 108 and determine, using an NLOS detection component 114 and map data 116, detections and localization data associated with the NLOS object 122. The processor 110 can also registor the NLOS object 122 to a roadway infrastructure using the map data 116. The processor 110 can also detect various features (e.g., range, azimuth angle, range rate, elevation) of the NLOS object 122. The processor 110 can generate radar data, including the position and velocity of the NLOS object 122, for at least one automotive system. For example, the processor 110 can control, based on processed EM energy from the receiver 108, an autonomous or semi-autonomous driving system of the vehicle 102.

The map data 116 can provide a map of travel routes (e.g., highways, freeways, streets, roads) in an area along with objects near the travel routes (e.g., road barriers, traffic signs, guardrails). The map data 116 can be stored in CRM 112. In other implementations, the map data 116 can be stored in an online database or on a remote computing device, and the processor 110 can download, via communication devices, the map data 116. As described in greater detail below, the NLOS detection component 114 can use map data 116 to determine the viability of potential direct-path and multipath reflections associated with detections.

The NLOS detection component 114 obtains EM energy received by the receiver 108 or detections from an intermediate component. The NLOS detection component 114 uses the received EM energy or detections to identify detections associated with the NLOS object 122 and localize the NLOS object 122 relative to the radar system 104. As described above, multipath reflections are a propagation phenomenon where return radar signals travel via indirect paths. As a result of a multipath reflection, mirror images or echoes of the target (e.g., the NLOS object 122) are present in the radar data. The NLOS detection component 114 can use the techniques described below with respect to FIGS. 2 through 5 to differentiate between potential direct-path returns and multipath reflections associated with detections. The NLOS detection component 114 can also generate a track for the detected NLOS objects to follow their position and velocity. The radar system 104 can implement the NLOS detection component 114 as instructions in the CRM 112, hardware, software, or a combination thereof executed by the processor 110.

The radar system 104 can determine a distance to the NLOS object 122 based on the time it takes for the EM signals to travel from the radar system 104 to the NLOS object 122, and from the NLOS object 122 back to the radar system 104. The radar system 104 can also determine, using the NLOS detection component 114, a location of the NLOS object 122 in terms of a direction of departure (DoD) and a direction of arrival (DoA) based on the direction of one or more large-amplitude echo signal received by the radar system 104.

As an example, FIG. 1 illustrates the vehicle 102 traveling on a road 124 that includes a blind corner. A reflective surface 120 is near the road 124. The reflective surface 120 can be a wall, guardrail, fence, building, or another vehicle. The radar system 104 can detect the NLOS object 122 in front of the vehicle 102 using the described techniques of this disclosure.

The transmitter 106 of the radar system 104 transmits the EM signal 118 in front of the vehicle 102. The EM signal 118 reflects off of the reflective surface 120 toward the NLOS object 122, which can be located outside the field-of-view of the radar system 104. The NLOS object 122 reflects the transmitted EM signal 118. The reflected EM signal reflects off of the reflective surface 120 and travels back to the receiver 108. The NLOS detection component 114 detects and localizes the NLOS object 122. For example, the radar system 104 can localize the NLOS object 122 in terms of a vehicle coordinate system with an x-axis (e.g., in a forward direction along the road 124) and a y-axis (e.g., perpendicular to the x-axis and along a surface of the road 124). The NLOS detection component 114 can also determine, using the map data 116, that a direct-path reflection associated with the detection is not located within the road 124 (e.g., conceivably positioned far from the vehicle and off the sheet that includes FIG. 1).

The vehicle 102 can also include at least one automotive system that relies on data from the radar system 104, such as a driver-assistance system, an autonomous-driving system, or a semi-autonomous-driving system. The radar system 104 can include an interface to the automotive systems that rely on the data. For example, the processor 110 outputs, via the interface, a signal based on EM energy received by the receiver 108.

Generally, the automotive systems use radar data provided by the radar system 104 to perform a function. For example, the driver-assistance system can provide NLOS monitoring and generate an alert that indicates a potential collision with the NLOS object 122 (e.g., the NLOS object 122 is in the same lane as the vehicle 102 and is traveling at a slower speed). The radar data can also indicate when it is safe or unsafe to maintain a current lane or speed. The autonomous-driving system may move the vehicle 102 to a particular location on the road 124 while avoiding collisions with the NLOS object 122. The radar data provided by the radar system 104 can provide information about the distance to and the location of the NLOS object 122 to enable the autonomous-driving system to perform emergency braking, perform a lane change, lane bias, or adjust the speed of the vehicle 102.

Figure 2:
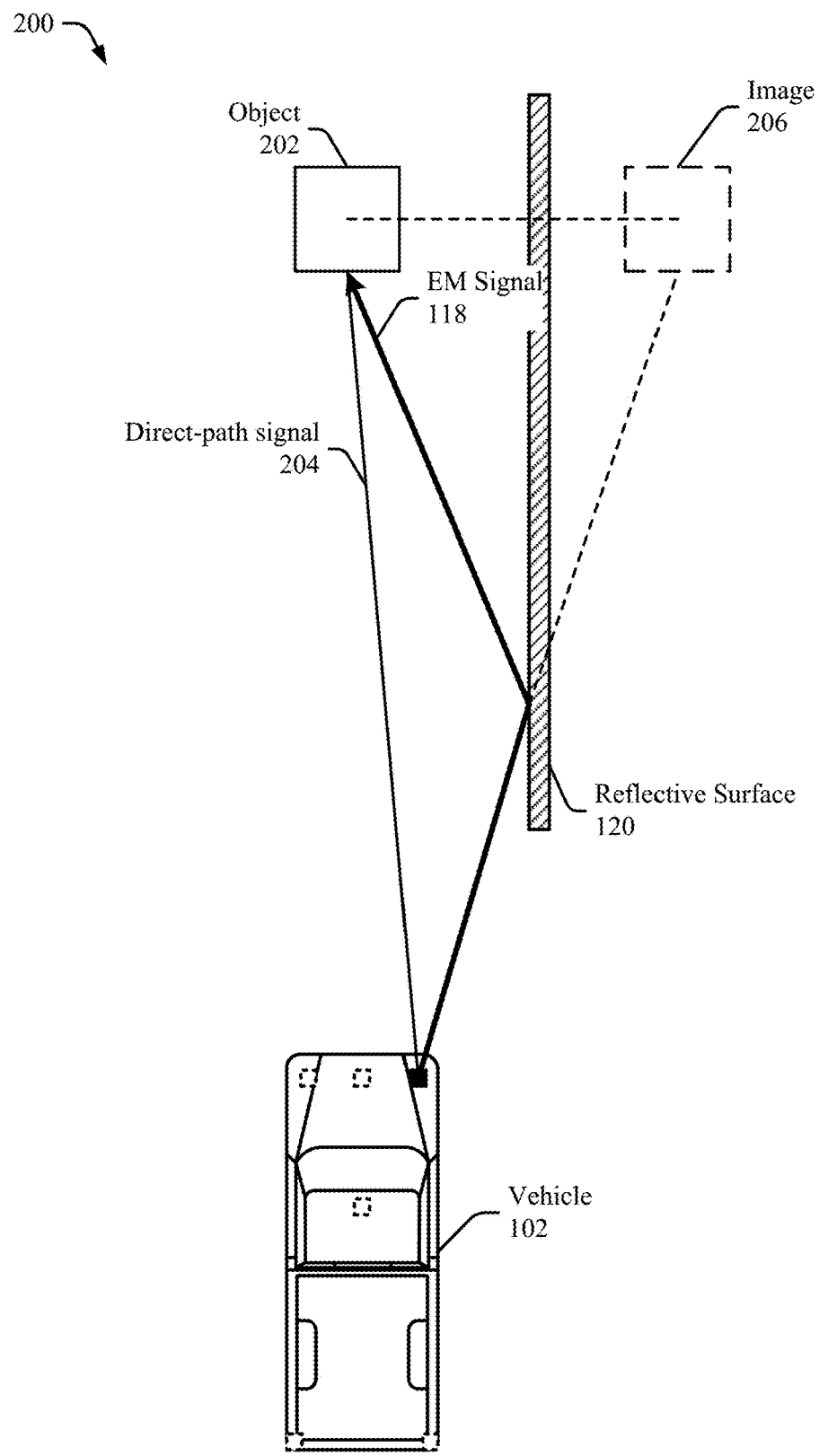
FIG. 2 illustrates a schematic representation of multipath radar propagation and illustrates key concepts for using multipath radar reflections to detect and localize NLOS objects.

FIG. 2 illustrates a schematic representation 200 of multipath radar propagation and illustrates key concepts for using multipath radar reflections to detect and localize NLOS objects. An object 20 can be at different positions relative to vehicle 102, including being within or outside of the line-of-sight of the radar system 104. The reflective surface 120 (e.g., a guardrail, a railing, a construction zone boundary, a fence, another vehicle) or a reflective object is positioned to the right of vehicle 102. The radar system 104 detects the object 202, by emitting the EM signal 118 and receiving a reflected EM signal.

The radar system 104 transmits the EM signal 118 in different directions and when reflected some of these signals can reach the receiver 108 via multiple paths. The shortest path is a direct-path transmission and reflection of the radar signal, as represented by a direct-path signal 204 in FIG. 2. The direct-path signal 204 generally also results in the strongest (e.g., highest energy level) reflected signal. However, the direct-path signal 204 is not always available due to obstructions, curves in the roadway, or other issues. As a result, the object 202 can be outside of the line-of-sight for the radar system 104.

The reflected signal can also propagate to the receiver 108 via one or more indirect paths. Indirect paths can occur when the reflective surface 120 redirects the EM signals. For example, the EM signal 118 can bounce off of the reflective surface 120 before reflecting off of the object 202 and travel back to the receiver 108 via the same path, resulting in a multipath reflection.

Multipath reflections allow the radar system 104 to detect NLOS objects via indirect paths. As a result of the multipath reflection, the radar system 104 must determine whether the detection is the result of a direct-path return or a multipath return. The direct-path return is associated with an image 206 of the object 202. The image 206 results from assuming a direct-path return based on the direction-of-arrival for the EM signal received by the receiver 108. As illustrated in FIG. 2, the range for the multipath return and the direct-path return is similar, but the NLOS detection component 114 can use the map data 116 to differentiate between a multipath return and a direct-path return as described in greater detail below concerning FIGS. 4 and 5.

Multipath reflections can generally occur via specular reflections or diffuse reflections. A specular reflection assumes a flat and smooth mirroring surface, whereas a diffuse reflection assumes a rough surface causing many returns. In the automotive environment, the radar system 104 can generally assume that the reflective surface 120 is approximately specular.

The multipath reflection for object 202 via the reflective surface 120 can be defined as a sum of direct and indirect paths, which is illustrated in Equation (1):

$$s_r(t) = s_t\left(t - \frac{R_d}{c}\right) + Gs_t\left(t - \frac{R_i}{c}\right), \quad (1)$$

where $s_t$ is the transmitted signal 118, $R_d$ and $R_i$ are direct and indirect path ranges, respectively, and G is the earth's reflection coefficient. The received EM signal can be further written as shown in Equation (2):

$$s_r(t) = e^{j2\pi f t} e^{j\frac{2\pi R_d}{\lambda}} \left(1 + Ge^{j\frac{2\pi \Delta R}{\lambda}}\right) \quad (2)$$

where $\Delta R = R_i - R_d$. The described radar system 104 and NLOS detection component 114 can perform object detection and localization for object 202 as described in greater detail below concerning FIGS. 3 through 5.

Vehicle Configuration

Figure 3:
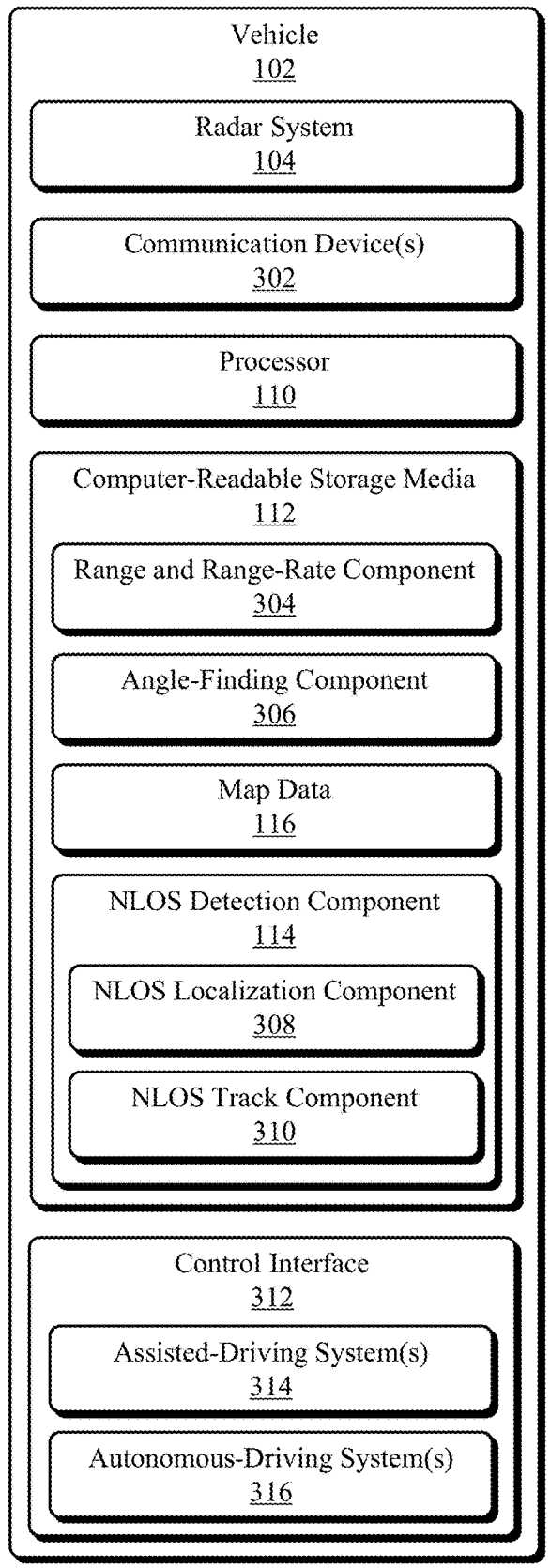
FIG. 3 illustrates an example configuration of a vehicle with a radar system that can detect and localize NLOS objects using multipath radar reflections and map data.

FIG. 3 illustrates an example configuration of a vehicle with a radar system that can detect and localize NLOS objects using multipath radar reflections and map data. As described for FIG. 1, the vehicle 102 can include the radar system 104, the processor 110, the CRM 112, the NLOS detection component 114, which includes an NLOS localization component 308 and an NLOS track component 310, and map data 116. In addition, the radar system includes a range and range-rate component 304 and an angle-finding component 306. The vehicle 102 can also include one or more communication devices 302 and a control interface 312 to one or more vehicle-based systems, including one or more assisted-driving systems 314 and one or more autonomous-driving systems 316.

The communication devices 302 can include a sensor interface and a vehicle-based system interface. The sensor interface and the vehicle-based system interface can transmit data (e.g., radar data, range computations, tracks, and other features mapped to the NLOS objects 122) over a communication bus of the vehicle 102, for example, when the individual components of the radar system 104 and/or the NLOS detection component 114 are integrated within the vehicle 102.

The vehicle 102 also includes the control interface 312 to one or more vehicle-based systems (e.g., the assisted-driving systems 314 and autonomous-driving systems 316), which individually or in combination provide a way for receiving radar data to control the vehicle 102. Some examples of vehicle-based systems to which the control interface 312 supplies radar data include the assisted-driving system 314 and the autonomous-driving system 316; each may rely on information output from the NLOS detection component 114. For example, the vehicle-based systems may rely on data, which is communicated via the communication devices 302 and obtained from the radar system 104, to operate the vehicle 102 (e.g., braking, lane changing). Generally, the control interface 312 can use data provided by the NLOS detection component 114 to control operations of the vehicle 102 and perform certain functions not requiring control but also for outputting warnings to passengers, pedestrians, and other vehicles. For example, the assisted-driving system 314 can alert a driver of the NLOS objects 122 and perform evasive maneuvers to avoid a collision with the NLOS object 122. As another example, the autonomous-driving system 316 can navigate the vehicle 102 to a particular position in the road 124 to avoid a collision with the NLOS object 122. The vehicle-based systems can also provide early warnings or alerts to a driver about the NLOS object 122 (e.g., if the NLOS object 122 is located in the same lane as the vehicle 102 and presents an unsafe condition).

The range and range-rate component 304 receives radar data as input and then outputs processed radar data, which can include a range, a range rate, and classification of the NLOS objects 122. An input-processing function of the range and range-rate component 304 may maintain a feature-extraction function, as well as a post-processing or output function. The input-processing function enables the range and range-rate component 304 to receive radar data from the transmitter 106 and/or receiver 108 (e.g., to build a synthetic array).

In some implementations, the radar data is received as low-level, time-series data obtained from a MIMO antenna array to generate a synthetic array, which maps radar returns (e.g., narrowband signals) to input and output channels of the synthetic array. Using low-level, time-series data enables the NLOS detection component 114 to provide better detection resolution with the range and range-rate component 304 to extract features associated with the NLOS objects 122 that appear in the environment 100. The synthetic array can be formed using MIMO techniques to map the narrowband signals obtained to input and output channels of the synthetic array by impinging on the synthetic array from distinct directions.

The angle-finding component 306 obtains EM energy received by the receiver 108 and determines angles associated with the NLOS objects 122. For example, the angle-finding component 306 can process the radar data to generate range-angle maps or interpolated range-angle maps, including range-azimuth maps and/or range-elevation maps. The interpolated range-azimuth format can improve the accuracy of the NLOS detection component 114 by simplifying the labeling of NLOS objects 122, e.g., for use by a machine-learned model that is configured to make further estimations or predictions from the radar data received as input. The radar system 104 can implement the angle-finding component 306 as instructions in the CRM 112, hardware, software, or a combination thereof executed by the processor 110.

As described above, the NLOS detection component 114 can detect and localize the NLOS objects 122. In particular, the NLOS localization component 308 can determine a range and azimuth angle associated with the NLOS objects 122. The NLOS localization component 308 can determine a multipath range and a multipath angle associated with the NLOS objects 122.

For example, the NLOS localization component 308 can use a direct-path angle associated with an NLOS object 122 and determine whether a reflective object or reflective surface is located along the direct-path angle associated with the detection of the NLOS object 122. Upon determining that a reflective object or a reflective surface is located along the direct-path angle associated with the detection, the NLOS localization component 308 can determine an angle of reflection for the received EM energy at the reflective object or reflective surface. The angle of reflection can be determined based on the direct-path angle associated with the detection. The angle of reflection can also be determined based on the map data 116 or other sensor data (e.g., radar data, vision data, or lidar data) indicating an angle of the reflective surface relative to the radar system 104. The NLOS localization component 308 can also determine an angle of incidence for the received EM energy at the reflective object or the reflective surface based on the angle of reflection. The NLOS localization component 308 can then determine the multipath range and the multipath angle associated with the detection or the NLOS object 122 based on the angle of incidence and the direct-path range, respectively.

The NLOS track component 310 can generate tracks for each detected NLOS object 122 and append data to the NLOS tracks as additional localization information is determined for the NLOS objects 122. In this way, the radar system 104 can detect and localize the NLOS objects 122 earlier than other radar systems without the added cost or processing complexity of high-precision lidar systems. In addition, the described techniques and systems can improve the safety of the assisted-driving systems 314 and the autonomous-driving systems 316 by providing detection and localization data for the NLOS objects 122.

Example Method

Figure 4:
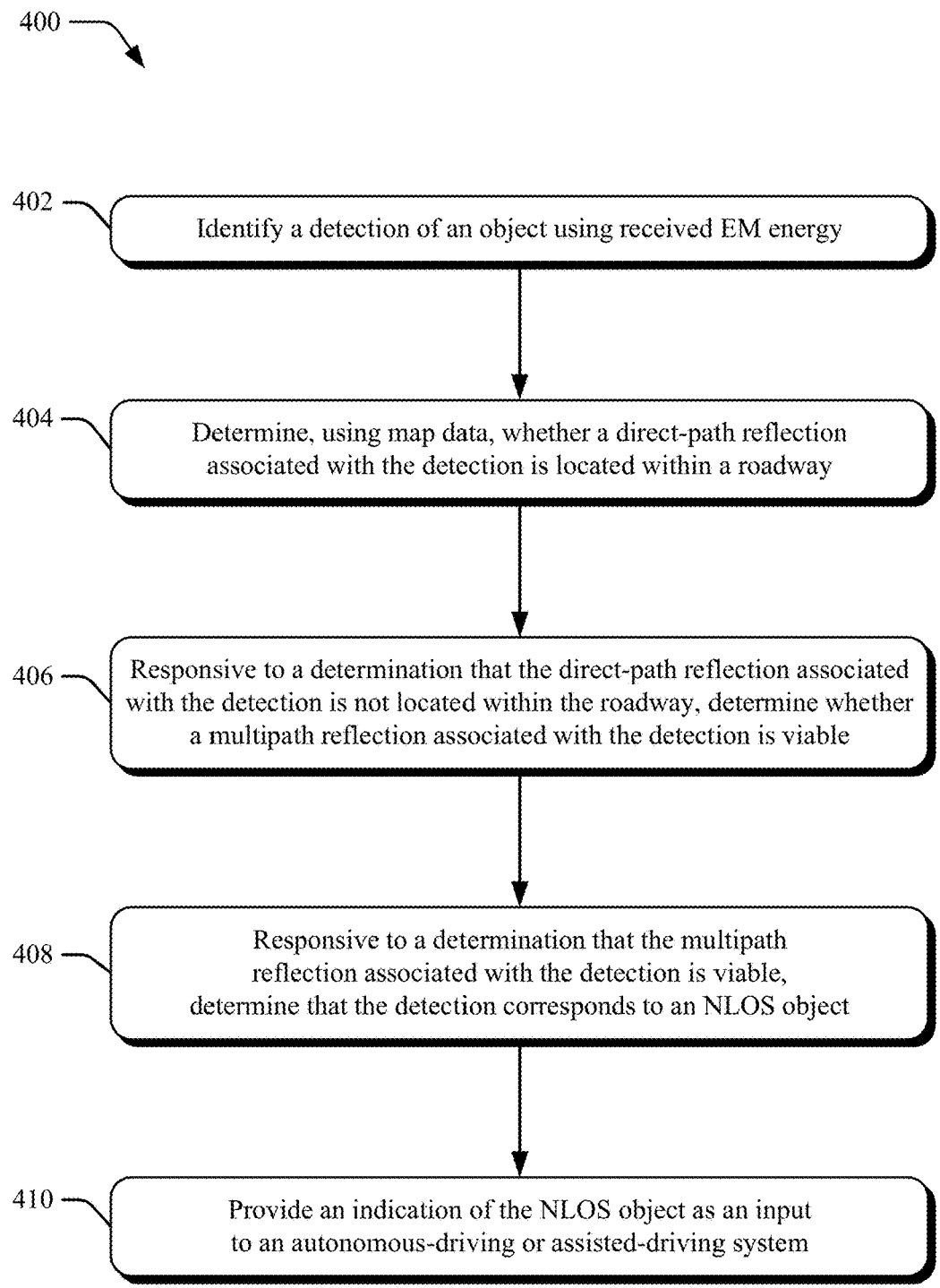
FIG. 4 illustrates an example method of a radar system to detect and localize NLOS objects using multipath radar reflections and map data.

FIG. 4 illustrates an example method 400 of a radar system to detect and localize NLOS objects using multipath radar reflections and map data. Method 400 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 1 through 3, reference to which is made for example only. The techniques are not limited to performance by one entity or multiple entities.

At 402, a detection of an object is identified using received EM energy. For example, the transmitter 106 of the radar system 104 can transmit EM energy, including the EM signal 118. The receiver 108 of the radar system 104 can receive EM energy reflected by one or more objects, including the NLOS object 122. The processor 110 of the radar system 104 can identify a detection of the NLOS object 122 using the received EM energy. The NLOS object 122 can be a stationary object or a moving object. The radar system 104 can use Doppler data to filter out NLOS objects 122 that are stationary.

At 404, it is determined whether a direct-path reflection associated with the detection is located within a roadway corresponding to a travel path of a vehicle using map data. For example, the processor 110 can determine, using map data, whether a direct-path angle and a direct-path range associated with the detection is located within the road 124. In particular, the processor 110 can determine, using the received EM energy, an angle (e.g., an azimuth angle) associated with the detection. The processor 110 can also determine, using the EM energy, a direct-path range associated with the detection. The map data can be included in CRM 112 or obtained over a communication link with a remote database.

At 406 and responsive to a determination that the direct-path reflection associated with the detection is not located within the roadway, it is determined whether a multipath reflection (e.g., a multipath range and multipath angle) associated with the detection is viable. For example, in response to determining that the direct-path reflection (e.g., a direct-path angle and a direct-path range) associated with the detection is not located within the road 124, the processor 110 can determine whether a multipath range and multipath angle associated with the detection are viable. The viability determination can be based on potential reflections of the EM energy off of objects (e.g., guardrails, signs, road barriers) included in the map data 116 or nearby objects (e.g., another vehicle, guardrails, signs, billboard) detected by one or more vehicle sensors (e.g., a vision system, a camera system, a lidar system, or the radar system 104). The viability determination can also be based on a determination whether the multipath range and multipath angle associated with the detection are registerable on the roadway infrastructure or geometry included in the map data 116.

The processor 110 can determine, using the map data 116 or data from the radar system 104, a lidar system, or a vision system, whether a reflective object is located along the direct-path angle associated with the detection. The viability of the reflective object that generates the multipath reflection can be enhanced by the location of the reflective object being included in an a priori map or a current sensor map. Responsive to a determination that a reflective object is located along the direct-path angle associated with the detection, the processor 110 can determine an angle of reflection for the received EM energy at the reflective object. The angle of reflection can be determined based on the direct-path angle associated with the detection. For example, the processor 110 can use the map data or sensor data to determine an angle of the reflective object relative to the radar system 104 and then determine the angle of reflection based on the direct-path angle and the relative angle. The processor 110 can then determine, based on the angle of reflection for the received EM energy at the reflective object, an angle of incidence for the received EM energy at the reflective object. Using the angle of incidence for the received EM energy at the reflective object and the direct-path range associated with the detection, the processor 110 can determine the multipath range and multipath angle associated with the detection. The processor 110 can then determine, using the map data 116, whether the multipath range and the multipath angle associated with the detection is viable.

At 408, the detection is determined to correspond to an NLOS object responsive to a determination that the multipath reflection associated with the detection is viable. For example, responsive to a determination that the multipath range and the multipath angle associated with the detection are viable, the processor 110 can determine that the detection corresponds to the NLOS object 122. In making this determination, the processor 110 can also determine, using road geometries included in the map data 116, whether a multipath position associated with the detection is viable. The processor 110 can also start or update a track associated with the NLOS object 122 with the multipath range, multipath angle, multipath range rate, or multipath position associated with the detection. The processor 110 can use registration to the map data 116 to maintain viability of the tracked NLOS object 122.

At 410, an indication of the NLOS object is provided as an input to an autonomous-driving or assisted-driving system. For example, the radar system 104 can provide an indication of the NLOS object 122 as an input to the assisted-driving system 314 or the autonomous-driving system 316. The NLOS data can include the multipath range, multipath angle, multipath position, multipath range rate, or track associated with the NLOS object 122. In this way, the assisted-driving system 314 or the autonomous-driving system 316 can improve its safety.

Figure 5:
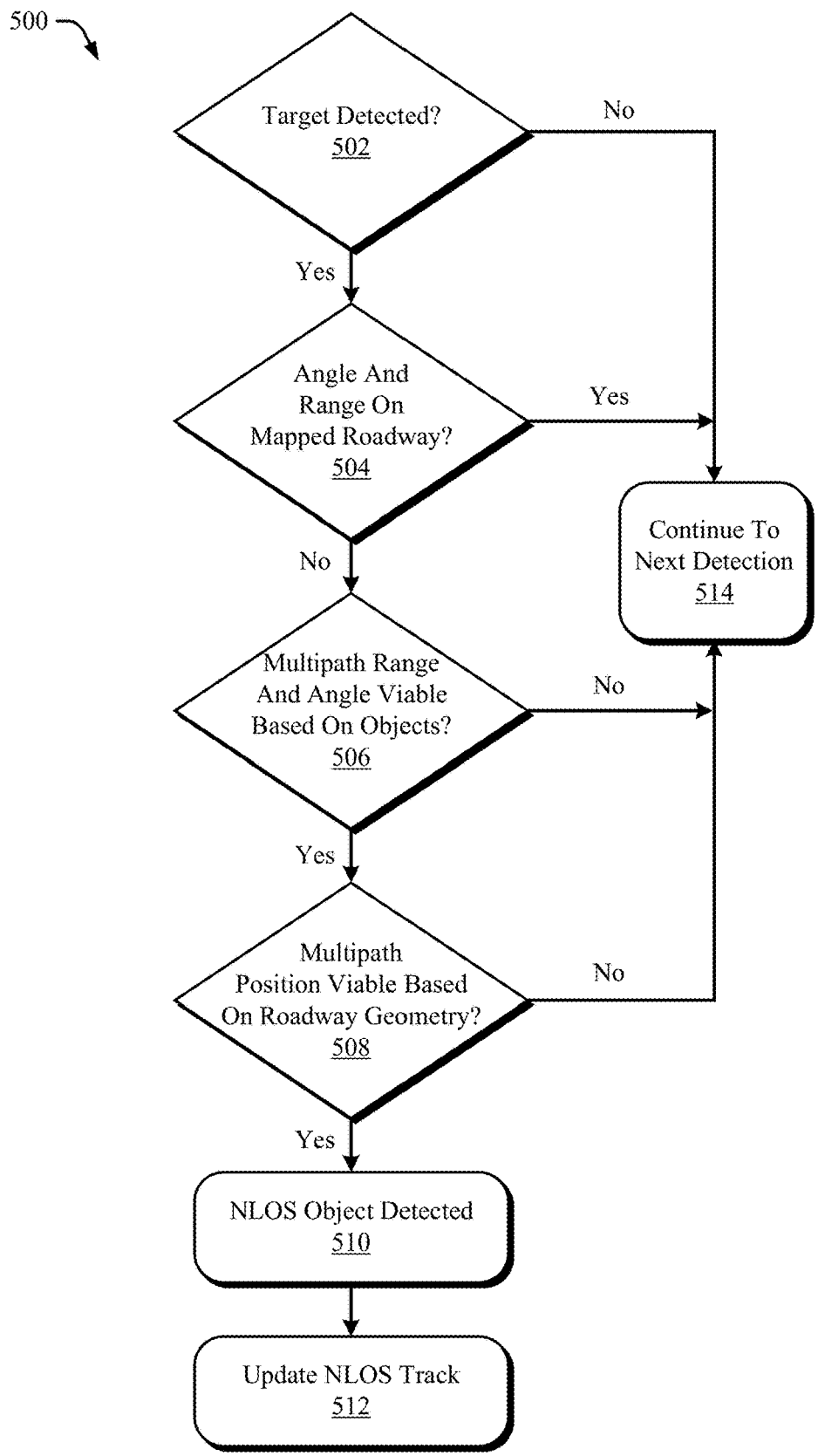
FIG. 5 illustrates an example flowchart of the described techniques and systems to detect and localize NLOS objects using multipath radar reflections and map data.

FIG. 5 illustrates an example flowchart 500 of the described techniques and systems to detect and localize NLOS objects using multipath radar reflections and map data. The radar system of FIG. 5 can, for example, be the radar system 104 of FIGS. 1 and 3, which includes the NLOS detection component 114 and the map data 116.

At 502, the NLOS detection component 114 determines whether a target (e.g., a moving object or a stationary object) is detected. In particular, the transmitter 106 of the radar system 104 can transmit EM energy, including the EM signal 118. The receiver 108 of the radar system 104 can receive EM energy reflected by one or more objects, including the NLOS object 122. The processor 110 of the radar system 104 can identify a detection of the NLOS object 122 using the received EM energy. The processor 110 can also determine whether the detection indicates the NLOS object 122 is moving or stationary.

At 504, if the detection is a target, the NLOS detection component 114 determines whether an angle and range associated with the detection are located on the mapped roadway. In particular, the processor 110 can determine, using the map data 116 and assuming a direct-path reflection, whether an angle (e.g., an azimuth angle) and range associated with the detection is located within the road 124. As another example, the processor 110 can determine that a reflective surface is located along the direct-path angle of the detection. If the map data 116 indicates that it is improbable for a moving object to be located on the other side of the reflective surface, then the NLOS detection component 114 can determine with a higher level of certainty that the detection is the result of a multipath reflection from an NLOS object. As another example, the processor 110 can determine that the multipath reflection from the NLOS object 122 is on the road 124 by using the map data 116.

At 506, if the direct-path angle and direct-path range associated with the detection are not located on the mapped roadway, the NLOS detection component 114 determines whether a multipath range and a multipath angle associated with the detection are viable based on nearby objects. In particular, the viability determination can be based on potential reflections of the EM energy off of objects (e.g., guardrails, signs, road barriers) included in the map data 116 or nearby objects (e.g., another vehicle, guardrails, signs, billboard) detected by one or more vehicle sensors (e.g., a vision system, a camera system, lidar system, or the radar system 104). As described above, the NLOS detection component 114 can use the direct-path angle, the direct-path range, and a relative angle of a reflective object to determine the multipath angle and multipath range associated with the detection.

At 508, if the multipath range and multipath angle are viable, the NLOS detection component 114 determines whether a multipath position associated with the detection is viable based on the roadway geometry. In particular, the processor 110 can determine, using the the map data 116, whether the multipath position is located on the road 124. In particular, the processor 110 can determine, using the map data 116, whether the multipath position (e.g. the multipath range and the multipath angle) is located within a lane of the road 124. The processor 110 can also use the multipath position to determine in which lane of the road 124 the detection is located.

At 510, if the multipath position is viable based on the roadway geometry, the NLOS detection component 114 determines that an NLOS object 122 is detected. In addition, if the map data 116 includes lane-level map data (e.g., indicating individual lanes of the road 124) or HD map data, then the NLOS detection component 114 can also use the multipath position of the NLOS object 122 to determine in which lane the NLOS object 122 is located and register the NLOS object 122 to a map to match the multipath position and trajectory to the road shape of the road 124.

At 512, the NLOS detection component 114 also starts, updates, or appends an NLOS track for the NLOS object 122 with the multipath range, multipath angle, and/or multipath position associated with the NLOS object 122.

At 514, the NLOS detection component 114 continues to the next detection and begins the flowchart 500 again if a negative response is determined for steps 502, 506, or 508 or a positive response is determined for step 504.

The described techniques and systems of the NLOS detection component 114 allow the radar system 104 to detect and localize NLOS objects using multipath radar reflections and map data. In this way, the described systems and techniques provide NLOS detections and localizations without the added cost of high-precision lidar systems. The NLOS detections and localizations also improve the safety and effectiveness of the assisted-driving system 314 and the autonomous-driving system 316.

Figures 1, 6:
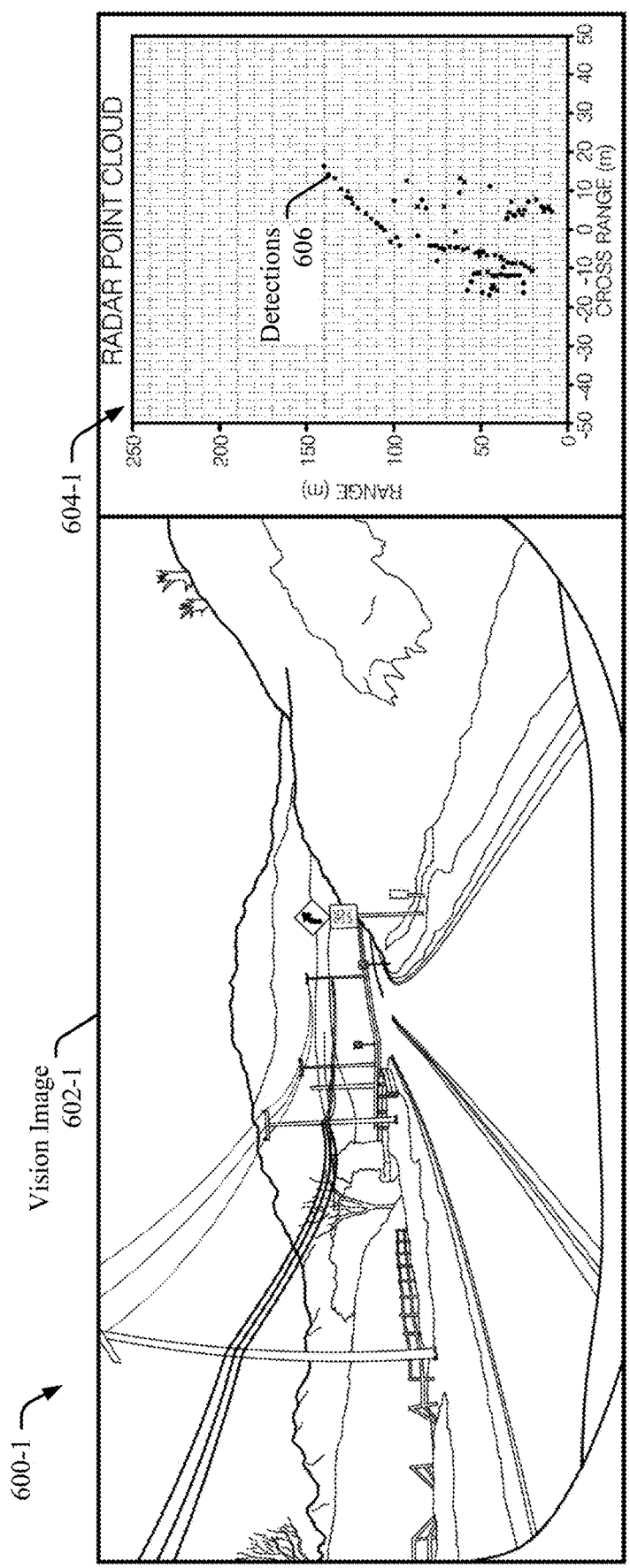
Figures 2, 6:
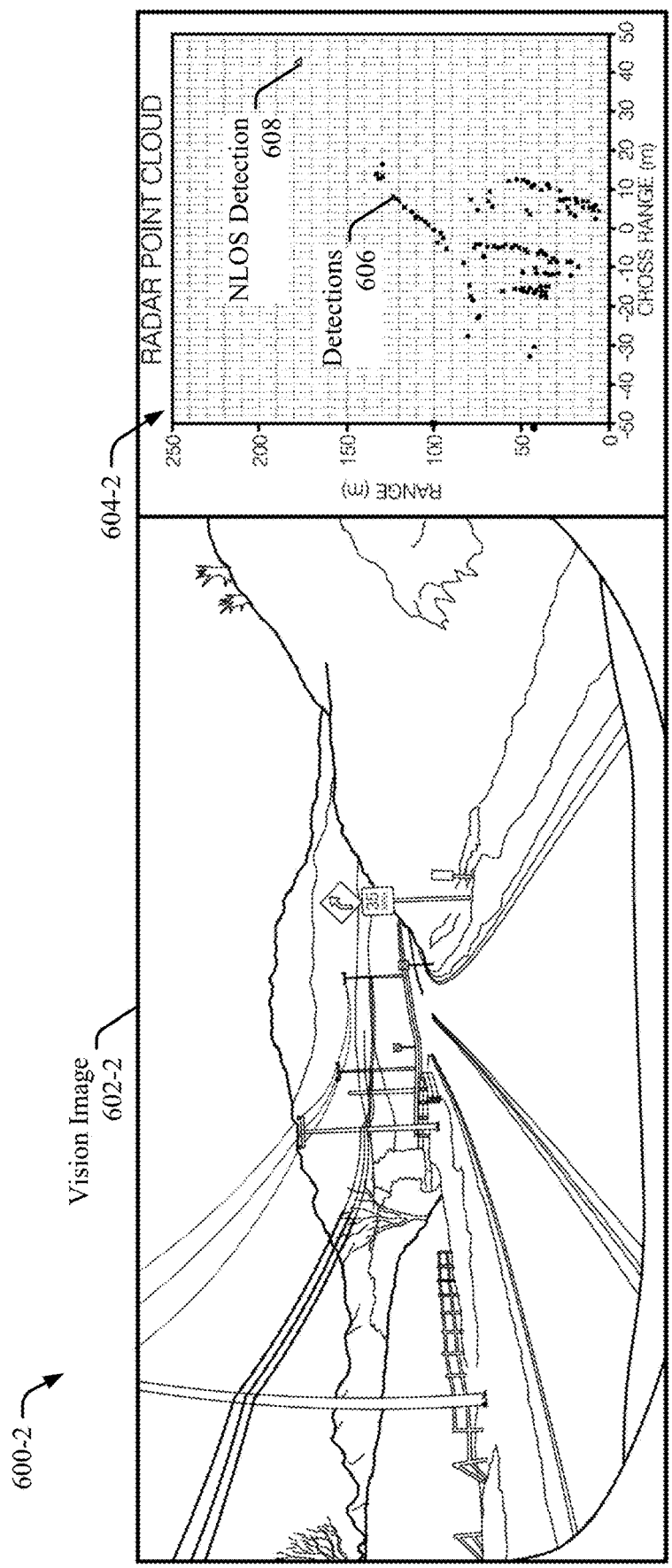
Figures 3, 6:
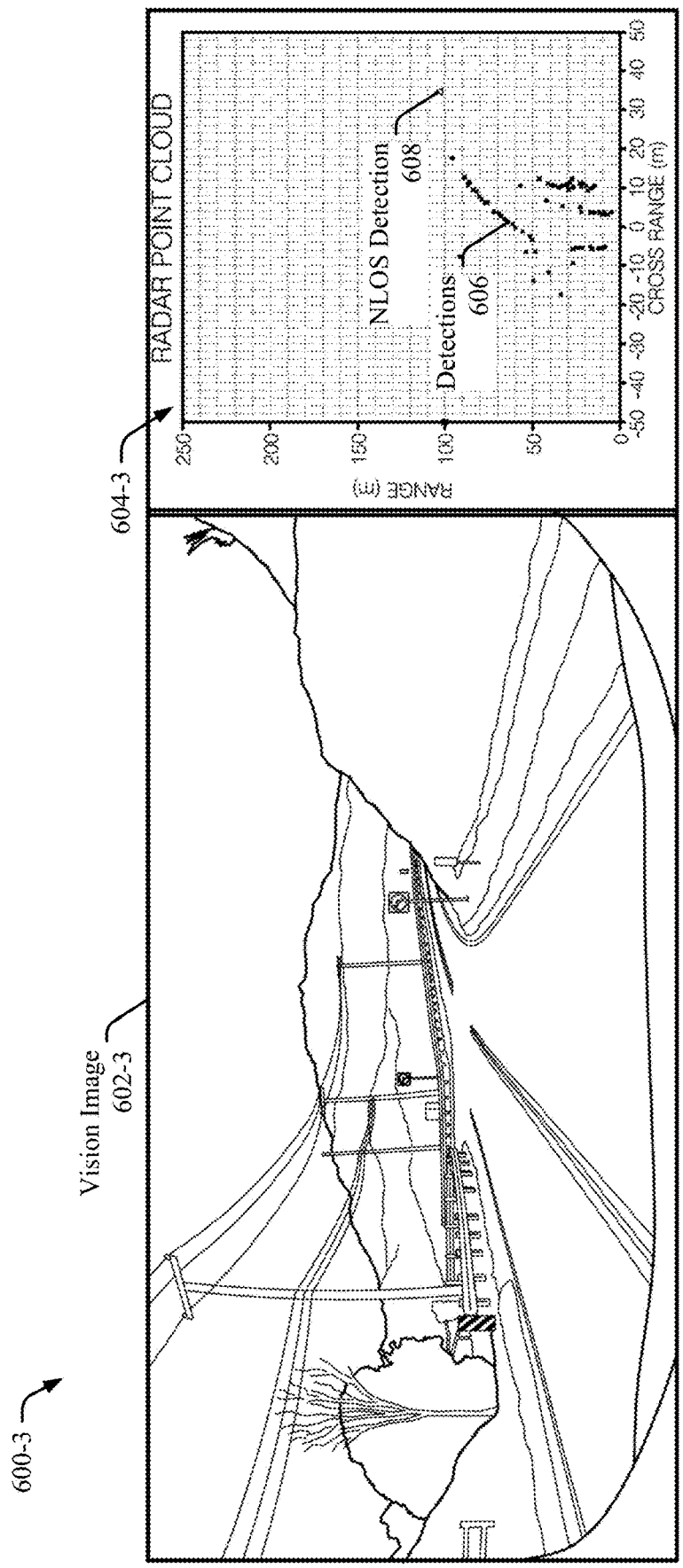
Figures 4, 6:
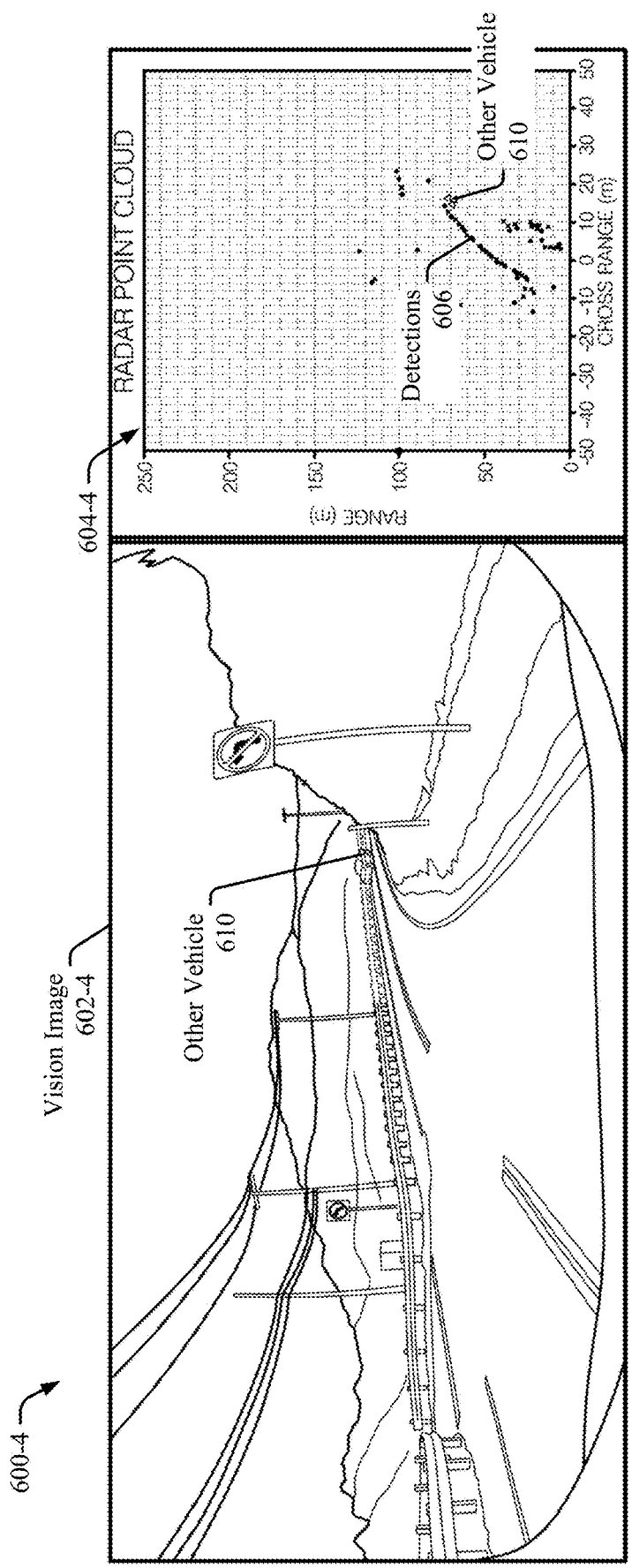

FIG. 6-1 through 6-4 illustrate example detections and localizations of an NLOS object using multipath radar reflections and map data in accordance with techniques of this disclosure. In the illustrated environment 600-1 through 600-4, a vehicle (e.g, the vehicle 102) is traveling on a road with a curve to the right. The vehicle 102 includes a radar system (e.g., the radar system 104), a vision-based system (e.g., a camera), and map data (e.g., the map data 116). Vision images 602-1 through 602-4 illustrate example still images of the road captured by the vision-based system in front of the vehicle. Plots 604-1 through 604-4 illustrate example radar point clouds generated by the radar system 104, providing the range (e.g., in meters) along a y-axis and the cross-range (e.g, in meters) along an x-axis associated with detections.

In FIG. 6-1, the vehicle 102 is approaching the curve in the road. The vision image 602-1 illustrates that a curve is approaching in about 100 meters. The plot 604-1 indicates detections 606 associated with guardrails, fencing, sign posts, utility poles, and other stationary objects along the side of the road. As illustrated in the vision image 602-1 and the plot 604-1 another vehicle is currently not detected along the road.

In FIG. 6-2, the vehicle 102 continues to approach the curve in the road. The vision image 602-2 and the plot 604-2 illustrate that the curve is now about 80 meters away. The plot 604-2 indicates the detections 606 associated with the guardrails, fencing, sign posts, utility poles, and other stationary objects along the side of the road. The plot 604-2 also indicates an NLOS detection 608 associated with a moving NLOS object (e.g., another vehicle) about 180 meters down range and about 45 meters to the right and around the corner. The NLOS object (e.g., the NLOS object 122) is not currently visible within the image 602-2. As described with respect to FIGS. 4 and 5, the NLOS detection component 114 can determine that the NLOS detection 608 is due to a multipath reflection off of one of the stationary detections 606 (e.g., the guardrail to the left of the road).

In FIG. 6-3, the vehicle 102 continues to approach the curve in the road. The vision image 602-3 and the plot 604-3 illustrate that the curve is now about 50 meters away. The plot 604-3 indicates the detections 606 associated with the guardrails, fencing, sign posts, utility poles, and other stationary objects along the side of the road. The plot 604-3 also indicates the NLOS detection 608 associated with the moving NLOS object is now about 100 meters down range and about 35 meters to the right and around the corner. The NLOS object, however, is still not currently visible within the image 602-3.

In FIG. 6-4, the vehicle 102 continues to approach the curve in the road. The vision image 602-4 and the plot 604-4 illustrate that the curve is now about 25 meters away. The plot 604-4 indicates the detections 606 associated with the guardrails, fencing, sign posts, utility poles, and other stationary objects along the side of the road. The plot 604-4 also indicates another vehicle 610, which corresponds to the previous NLOS detections 608 in plots 604-2 and 604-3 and is now currently visible in the image 602-4. The other vehicle 610 is now about 70 meters down range and about 15 meters to the right on the curve in the road. In the illustrated scenario of FIGS. 6-1 through 6-4, the radar system 104 was able to detect and localize the other vehicle 610 while it was still not within the field-of-view of the vision-based system and at least 70 meters before the vision-based system was able to detect it.

EXAMPLES

In the following section, examples are provided.

Example 1: A radar system comprising: a transmitter configured to transmit electromagnetic (EM) energy; a receiver configured to receive EM energy reflected by one or more objects; and one or more processors configured to: identify, using the received EM energy, a detection of an object; determine, using map data, whether a direct-path reflection associated with the detection is located within a roadway corresponding to a travel path of a vehicle; responsive to a determination that the direct-path reflection associated with the detection is not located within the roadway, determine whether a multipath reflection associated with the detection is viable; responsive to a determination that the multipath reflection associated with the detection is viable, determine that the detection corresponds to a non-line-of-sight (NLOS) object; and provide an indication of the NLOS object as an input to an autonomous-driving or assisted-driving system.

Example 2: The radar system of example 1, wherein the one or more processors are further configured to: determine, using the received EM energy, a direct-path angle and a direct-path range associated with the detection; and responsive to a determination that the multipath reflection associated with the detection is viable, determine, using the received EM energy and the map data, a multipath range and a multipath angle associated with the detection.

Example 3: The radar system of example 2, wherein the one or more processors are configured to determine whether the direct-path reflection associated with the detection is located within the roadway by determining, using the map data, whether the direct-path angle and the direct-path range associated with the detection are located within the roadway.

Example 4: The radar system of example 2 or 3, wherein the one or more processors are further configured to determine, using the map data, the multipath range, and the multipath angle, whether a multipath position associated with the detection is viable.

Example 5: The radar system of example 4, wherein a determination that the multipath position associated with the detection is viable comprises determining whether the multipath position is located within a lane of the roadway.

Example 6: The radar system of any of examples 2 through 5, wherein the one or more processors are configured to determine whether the multipath reflection associated with the detection is viable by: determining whether a reflective object is located along the direct-path angle associated with the detection; responsive to determining that a reflective object is located along the direct-path angle associated with the detection, determining, based on the direct-path angle associated with the detection, an angle of reflection for the received EM energy at the reflective object; determining, based on the angle of reflection for the received EM energy at the reflective object, an angle of incidence for the received EM energy at the reflective object; and determining the multipath range and multipath angle associated with the detection based on the angle of incidence for the received EM energy at the reflective object and the direct-path range associated with the detection, respectively.

Example 7: The radar system of example 6, wherein the one or more processors are configured to determine whether the reflective object is located along the direct-path angle associated with the detection based on reflective objects included in the map data or reflective objects detected by the radar system, a lidar system, or a vision system.

Example 8: The radar system of any preceding example, wherein: the NLOS object is moving; and the one or more processors are further configured to start or update a track associated with the NLOS object.

Example 9: The radar system of example 8, wherein the one or more processors are further configured to provide the track associated with the NLOS object as another input to the autonomous or semi-autonomous driving system.

Example 10: The radar system of any preceding example, wherein: the NLOS object is stationary; and the one or more processors are further configured to start or update a track associated with the NLOS object.

Example 11: The radar system of example 10, wherein the one or more processors are further configured to provide the track associated with the NLOS object as another input to the autonomous or semi-autonomous driving system.

Example 12: The radar system of any preceding example, wherein the radar system is configured to be installed in a vehicle.

Example 13: The radar system of example 12, wherein the map data is included in a memory of the vehicle.

Example 14: The radar system of example 12, wherein the map data is obtained from a remote computer system.

Example 15: A computer-readable storage media comprising computer-executable instructions that, when executed, cause a processor of a radar system to: identify, using EM energy reflected by one or more objects, a detection of an object; determine, using map data, whether a direct-path reflection associated with the detection is located within a roadway corresponding to a travel path of a vehicle; responsive to a determination that the direct-path reflection associated with the detection is not located within the roadway, determine whether a multipath reflection associated with the detection is viable; responsive to a determination that the multipath reflection associated with the detection is viable, determine that the detection corresponds to a non-line-of-sight (NLOS) object; and provide an indication of the NLOS object as an input to an autonomous-driving or assisted-driving system.

Example 16: The computer-readable storage media of example 15, wherein the computer-readable storage media further comprises computer-executable instructions that, when executed, cause the processor of the radar system to: determine, using the received EM energy, a direct-path angle and a direct-path range associated with the detection; and responsive to a determination that the multipath reflection associated with the detection is viable, determine, using the received EM energy and the map data, a multipath range and a multipath angle associated with the detection.

Example 17: The computer-readable storage media of example 16, wherein the computer-readable storage media further comprises computer-executable instructions that, when executed, cause the processor of the radar system to determine whether the direct-path reflection associated with the detection is located within the roadway by determining, using the map data, whether the direct-path angle and the direct-path range associated with the detection are located within the roadway.

Example 18: The computer-readable storage media of example 16 or 17, wherein the computer-readable storage media further comprises computer-executable instructions that, when executed, cause the processor of the radar system to determine, using the map data, the multipath range, and the multipath angle, whether a multipath position associated with the detection is viable.

Example 19: The computer-readable storage media of any of examples 16 through 18, wherein the computer-readable storage media further comprises computer-executable instructions that, when executed, cause the processor of the radar system to determine whether the multipath reflection associated with the detection is viable by: determining whether a reflective object is located along the direct-path angle associated with the detection; responsive to determining that a reflective object is located along the direct-path angle associated with the detection, determining, based on the direct-path angle associated with the detection, an angle of reflection for the received EM energy at the reflective object; determining, based on the angle of reflection for the received EM energy at the reflective object, an angle of incidence for the received EM energy at the reflective object; and determining the multipath range and multipath angle associated with the detection based on the angle of incidence for the received EM energy at the reflective object and the direct-path range associated with the detection, respectively.

Example 20: The computer-readable storage media of example 19, wherein the computer-readable storage media further comprises computer-executable instructions that, when executed, cause the processor of the radar system to determine whether the reflective object is located along the direct-path angle associated with the detection based on reflective objects included in the map data or reflective objects detected by the radar system, a lidar system, or a vision system.

Example 21: The computer-readable storage media of any of examples 15 through 20, wherein: the NLOS object is moving; and the computer-readable storage media further comprises computer-executable instructions that, when executed, cause the processor of the radar system to start or update a track associated with the NLOS object.

Example 22: The computer-readable storage media of example 21, wherein the computer-readable storage media further comprises computer-executable instructions that, when executed, cause the processor of the radar system to provide the track associated with the NLOS object as another input to the autonomous or semi-autonomous driving system.

Example 23: A computer-readable storage media comprising computer-executable instructions that, when executed, cause a processor of a radar system to perform as configured inf any of examples 1 through 14.

Example 24: A method comprising: identifying, using EM energy reflected by one or more objects and received by a receiver of a radar system, a detection of an object; determining, using map data, whether a direct-path reflection associated with the detection is located within a roadway corresponding to a travel path of a vehicle; responsive to a determination that the direct-path reflection associated with the detection is not located within the roadway, determining whether a multipath reflection associated with the detection is viable; responsive to a determination that the multipath reflection associated with the detection is viable, determining that the detection corresponds to a non-line-of-sight (NLOS) object; and providing an indication of the NLOS object as an input to an autonomous-driving or assisted-driving system.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. A radar system installed in a host vehicle, the radar system comprising:
one or more processors configured to:
identify, using electromagnetic (EM) energy reflected by one or more objects and received by a receiver of the radar system, a detection of an object;
determine, using the received EM energy and assuming a direct-path reflection, a direct-path azimuth angle and a direct-path range associated with the detection;
determine, using map data, the direct-path azimuth angle, and the direct-path range, whether the direct-path reflection associated with the detection is located within a roadway corresponding to a travel path of the host vehicle;
responsive to a determination that the direct-path reflection associated with the detection is not located within the roadway, determine, using the received EM energy and assuming a multipath reflection, a multipath azimuth angle, a multipath range, and a multipath cross-range associated with the detection;
determine whether the multipath reflection associated with the detection is located within the roadway and not within a direct line-of-sight of the radar system by identifying, based on the map data, whether the multipath range, the multipath cross-range, and the multipath azimuth angle are located within the roadway and not within the direct line-of-sight of the radar system;

responsive to a determination that the multipath reflection associated with the detection is located within the roadway and not within the direct line-of-sight of the radar system, determine that the detection corresponds to a non-line-of-sight (NLOS) object; and provide an indication of the NLOS object, including the multipath range, the multipath cross-range, and the multipath azimuth angle, as an input to an autonomous-driving system or an assisted-driving system.

2. The radar system of claim 1, wherein a determination that the multipath reflection associated with the detection is located within the roadway comprises determining whether a multipath position associated with the detection is located within a lane of the roadway.

3. The radar system of claim 1, wherein the one or more processors are configured to determine whether the multipath reflection associated with the detection is located within the roadway by:

determining whether a reflective object is located along the direct-path azimuth angle associated with the detection;

responsive to determining that the reflective object is located along the direct-path azimuth angle associated with the detection, determining, based on the direct-path azimuth angle associated with the detection, an angle of reflection for the received EM energy at the reflective object;

determining, based on the angle of reflection for the received EM energy at the reflective object, an angle of incidence for the received EM energy at the reflective object; and determining the multipath range, the multipath cross-range, and multipath azimuth angle associated with the detection based on the angle of incidence for the received EM energy at the reflective object and the direct-path range associated with the detection.

4. The radar system of claim 3, wherein the one or more processors are configured to determine whether the reflective object is located along the direct-path azimuth angle associated with the detection based on reflective objects included in the map data or reflective objects detected by the radar system, a lidar system, or a vision system.

5. The radar system of claim 1, wherein:
the NLOS object is moving; and
the one or more processors are further configured to start or update a track associated with the NLOS object.

6. The radar system of claim 5, wherein the one or more processors are further configured to provide the track associated with the NLOS object as another input to the autonomous-driving system or the assisted-driving system.

7. The radar system of claim 1, wherein:
the NLOS object is stationary; and
the one or more processors are further configured to start or update a track associated with the NLOS object.

8. The radar system of claim 7, wherein the one or more processors are further configured to provide the track associated with the NLOS object as another input to the autonomous-driving system or the assisted-driving system.

9. The radar system of claim 1, wherein the map data is included in a memory of the host vehicle.

10. The radar system of claim 1, wherein the map data is obtained from a remote computer system.

11. A computer-readable storage medium comprising computer-executable instructions that, when executed, cause a processor of a radar system installed in a host vehicle to:

identify, using electromagnetic (EM) energy reflected by one or more objects and received by a receiver of the radar system, a detection of an object;

determine, using the received EM energy and assuming a direct-path reflection, a direct-path azimuth angle and a direct-path range associated with the detection;

determine, using map data, the direct-path azimuth angle, and the direct-path range, whether the direct-path reflection associated with the detection is located within a roadway corresponding to a travel path of the host vehicle;

responsive to a determination that the direct-path reflection associated with the detection is not located within the roadway, determine, using the received EM energy and assuming a multipath reflection, a multipath azimuth angle, a multipath range, and a multipath cross-range associated with the detection;

determine whether the multipath reflection associated with the detection is located within the roadway and not within a direct line-of-sight of the radar system by identifying, based on the map data, whether the multipath range, the multipath cross-range, and the multipath azimuth angle are located within the roadway and not within the direct line-of-sight of the radar system;

responsive to a determination that the multipath reflection associated with the detection is located within the roadway and not within the direct line-of-sight of the radar system, determine that the detection corresponds to a non-line-of-sight (NLOS) object; and provide an indication of the NLOS object, including the multipath range, the multipath cross-range, and the multipath azimuth angle, as an input to an autonomous-driving system or an assisted-driving system.

12. The computer-readable storage medium of claim 11, wherein the computer-readable storage medium further comprises computer-executable instructions that, when executed, cause the processor of the radar system to determine whether the multipath reflection associated with the detection is located within the roadway by:

determining whether a reflective object is located along the direct-path azimuth angle associated with the detection;

responsive to determining that a reflective object is located along the direct-path azimuth angle associated with the detection, determining, based on the direct-path azimuth angle associated with the detection, an angle of reflection for the received EM energy at the reflective object;

determining, based on the angle of reflection for the received EM energy at the reflective object, an angle of incidence for the received EM energy at the reflective object; and determining the multipath range, the multipath cross-range, and the multipath azimuth angle associated with the detection based on the angle of incidence for the received EM energy at the reflective object and the direct-path range associated with the detection.

13. A method comprising:
identifying, using electromagnetic (EM) energy reflected by one or more objects and received by a receiver of a radar system installed in a host vehicle, a detection of an object;

determining, using the received EM energy and assuming a direct-path reflection, a direct-path azimuth angle and a direct-path range associated with the detection;

determining, using map data, the direct-path azimuth angle, and the direct-path range, whether the direct-path reflection associated with the detection is located within a roadway corresponding to a travel path of the host vehicle;

responsive to a determination that the direct-path reflection associated with the detection is not located within the roadway, determining, using the received EM energy and assuming a multipath reflection, a multipath azimuth angle, a multipath range, and a multipath cross-range associated with the detection;

determining whether the multipath reflection associated with the detection is located within the roadway and not within a direct line-of-sight of the radar system by identifying, based on the map data, whether the multipath range, the multipath cross-range, and the multipath azimuth angle are located within the roadway and not within the direct line-of-sight of the radar system;

responsive to a determination that the multipath reflection associated with the detection is located within the roadway and not within the direct line-of-sight of the radar system, determining that the detection corresponds to a non-line-of-sight (NLOS) object; and providing an indication of the NLOS object, including the multipath range, the multipath cross-range, and the multipath azimuth angle, as an input to an autonomous-driving system or an assisted-driving system.

* * * * *